(12) United States Patent  
Dabiri et al.

(10) Patent No.: US 8,582,633 B2
(45) Date of Patent: Nov. 12, 2013

(54) CONFIRMATION OF PRESENCE OF NARROWBAND INTERFERENCE BY HARMONIC ANALYSIS

(75) Inventors: Dariush Dabiri, San Jose, CA (US); Dongwoon Bai, Sunnyvale, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 327 days.

(21) Appl. No.: 12/952,172

(22) Filed: Nov. 22, 2010

(65) Prior Publication Data

US 2012/0128049 A1    May 24, 2012

(51) Int. Cl.
*H04B 3/46* (2006.01)

(52) U.S. Cl.
USPC ............ 375/227; 375/296; 375/348; 375/346

(58) Field of Classification Search
USPC .................................. 375/227, 396, 348, 346
See application file for complete search history.

(56) References Cited

U.S. PATENT DOCUMENTS

| | | | |
|---|---|---|---|
| 5,671,247 A * | 9/1997 | Souissi et al. .................. 375/144 |
| 6,904,443 B2 | 6/2005 | White |
| 6,976,044 B1 | 12/2005 | Kilani |
| 7,003,094 B2 | 2/2006 | Fischer et al. |
| 7,741,921 B2 | 6/2010 | Ismailov |
| 2003/0165205 A1 | 9/2003 | Chu et al. |
| 2007/0009011 A1 | 1/2007 | Coulson |
| 2008/0112525 A1 | 5/2008 | Do et al. |
| 2008/0267392 A1 | 10/2008 | Raheja et al. |
| 2008/0299932 A1* | 12/2008 | Belogolovy et al. .......... 455/296 |
| 2008/0304553 A1* | 12/2008 | Zhao et al. ..................... 375/148 |
| 2009/0061808 A1 | 3/2009 | Higgins |
| 2009/0238102 A1 | 9/2009 | Dabiri |
| 2009/0252234 A1 | 10/2009 | Samdani et al. |
| 2010/0177857 A1* | 7/2010 | Huttunen et al. ............. 375/350 |

OTHER PUBLICATIONS

U.S. Appl. No. 12/952,150, pp. 52.
U.S. Appl. No. 12/952,154, pp. 49.
U.S. Appl. No. 12/952,164, pp. 35.
U.S. Appl. No. 12/952,178, pp. 40.
U.S. Appl. No. 12/952,184, pp. 34.
U.S. Appl. No. 12/952,193, pp. 35.
Ungerboeck, G. "10GBASE-T Coding and Modulation: 128-DSQ + LDPC", IEEE P802.3an Task Force, Ottawa, Sep. 29-Oct. 1, 2004, pp. 15.

(Continued)

*Primary Examiner* — Kabir A Timory (57) ABSTRACT

One or more processing units confirm existence of narrow band interference in a signal by using an estimate f of the frequency, to check for one or more harmonics. In illustrative embodiments, the estimate f is automatically identified as a second harmonic if a predetermined criterion is satisfied by the signal (in the frequency domain) at either of two frequencies namely (A) frequency f/2 and (B) frequency (M−f)/2 and whichever of these two frequencies is stronger is identified as the fundamental frequency. In several such embodiments, the estimate f is automatically identified as a third harmonic if a predetermined criterion is satisfied by the signal (in the frequency domain) at any of three frequencies namely (C) frequency f/3 and (D) frequency (M−t)/3 and (E) frequency (M+f)/3. If the predetermined criteria are not met at all five frequencies (A)-(E) then f is identified as the fundamental frequency.

16 Claims, 8 Drawing Sheets

(56) References Cited

OTHER PUBLICATIONS

"802.3an—2006 IEEE Standard for Information Technology—Telecommunications and Information Exchange Between Systems—Local and Metropolitan Area Networks-Specific Requirements, Part 3: Carrier Sense Multiple Access With Collision Detection (CSMA/CD) Access Method and Physical Layer Specifications", Sep. 2006, pp. 167.

Stolle, R. "Electromagnetic Coupling of Twisted Pair Cables", published in IEEE Journal on Selected Areas in Communications, vol. 20, No. 5, Jun. 2002, pp. 883-891.

Nehorai, A. et al., "Adaptive Comb Filtering for Harmonic Signal Enhancement", published in IEEE Transactions on Acoustics, Speech, and Signal Processing, vol. ASSP-34, No. 5, Oct. 1986, pp. 1124-1138.

Nehorai, A. "A Minimal Parameter Adaptive Notch Filter With Constrained Poles and Zeros", published in IEEE Transactions on Acoustics, Speech, and Signal Processing, vol. ASSP-33, No. 4, Aug. 1985, pp. 983-996.

Stoica, P. et al. "Performance Analysis of an Adaptive Notch Filter with Constrained Poles and Zeros", published in IEEE Transactions on Acoustics, Speech, and Signal Processing, vol. 36, No. 6, Jun. 1988, pp. 911-919.

MacLeod, M.D. "Fast Nearly ML Estimation of the Parameters of Real or Complex Single Tones or Resolved Multiple Tones", published in IEEE Transactions on Signal Processing, vol. 46, No. 1, Jan. 1998, pp. 141-148.

\* cited by examiner

CONFIRMATION OF PRESENCE OF NARROWBAND INTERFERENCE BY HARMONIC ANALYSIS

CROSS-REFERENCE TO RELATED APPLICATIONS

This patent application is related to and incorporates by reference herein in their entirety, the following patent applications that are co-owned and concurrently filed herewith:
(1) U.S. patent application, entitled "Stabilized Digital Quadrature Oscillator" by Dariush Dabiri et al., application Ser. No. 12/952,154;
(2) U.S patent application, entitled "Detection and Estimation of Narrowband Interference By Matrix Multiplication" by Dariush Dabiri, application Ser. No. 12/952,164;
(3) U.S. patent application, entitled "Narrowband Interference Cancellation Method and Circuit" by Dariush Dabiri, application Ser. No. 12/952,150;
(4) U.S. patent application, entitled "Adaptive Spectral Enhancement and Harmonic Separation" by Dariush Dabiri et al., application Ser. No. 12/952,178;
(5) U.S. patent application, entitled "Adaptive Narrowband Interference Prediction Circuit and Method" by Dariush Dabiri et al., application Ser. No. 12/952,184; and
(6) U.S. patent application, entitled "Multi-Input IIR Filter with Error Feedback" by Maged F. Barsoum, et al., application Ser. No. 12/952,193.

BACKGROUND

In a local area network, a PHY device 12 in a computer 10 (FIG. 1A) may be connected to another PHY device 22 in an Ethernet Switch 20 by use of a cable 32. Cable 32 typically includes four twisted-pair copper conductors 32A-32D (which may be shielded or unshielded) that carry analog signals between four transceivers 12A-12D in PHY device 12 (that in turn is coupled to MAC device 11) and four transceivers 22A-22D in PHY device 22 (that in turn is coupled to MAC device 21). Each of transceivers 12A-12D typically includes a transmit data path and a receive data path in an integrated circuit (IC) die that forms PHY device 12. The transmit data path typically includes an FEC encoder, transmit circuitry, a digital to analog converter, an analog filter, and a line driver, illustrated unlabeled in FIG. 1A. Similarly, the receive data path typically includes corresponding components in a reverse order, e.g. a receive amplifier, an analog filter, an analog to digital converter, receive circuitry and an FEC decoder (also see FIG. 1A).

Figure 1A:
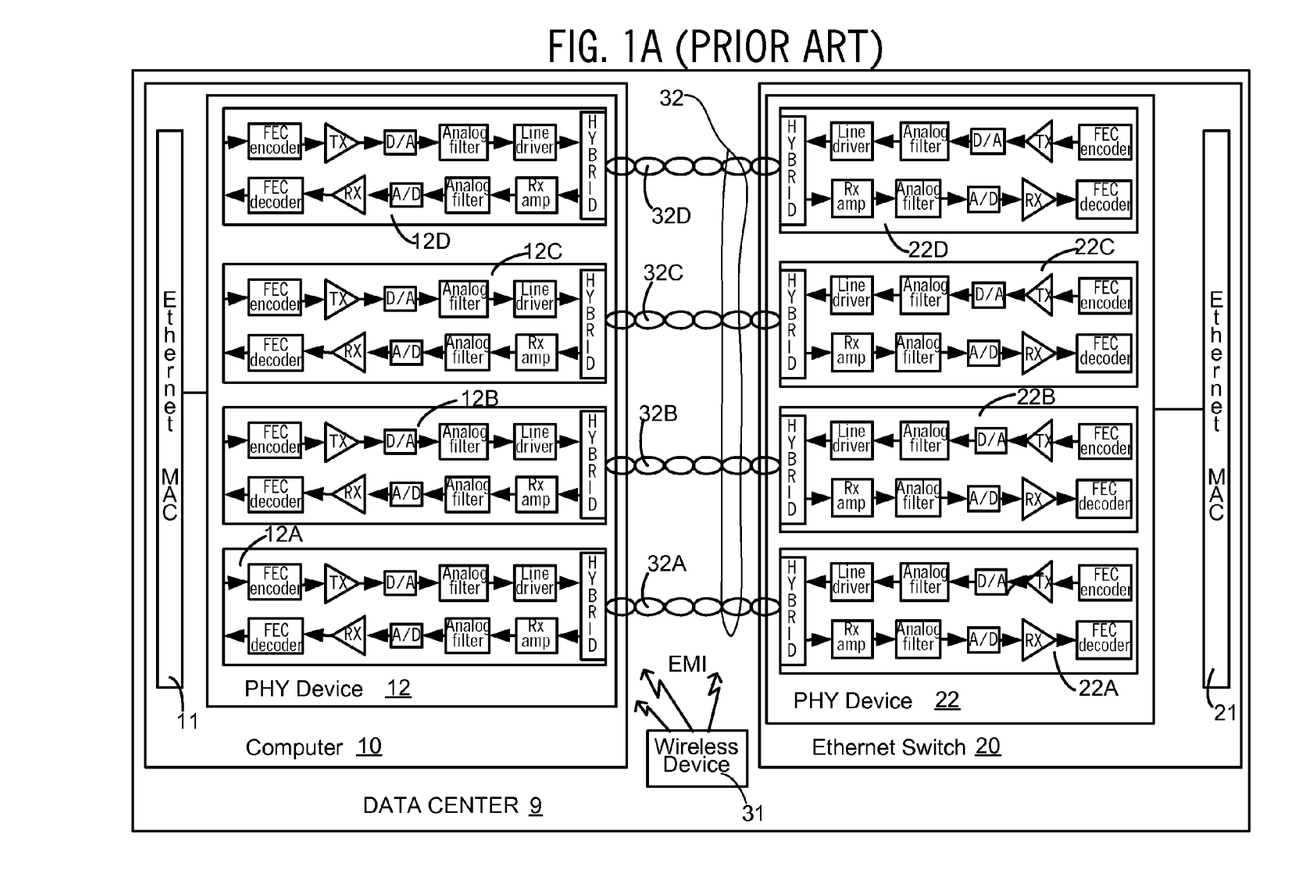
FIG. 1A illustrates, in a high level block diagram, a prior art data center 9 having a computer 10 and an Ethernet switch 20 interconnected by a cable 32, wherein cable 32 experiences electromagnetic interference (EMI) on operation of a wireless device 31.

A signal received from cable 32 by any of transceivers 22A-22D is typically weak, and any degradation affects the bit error rate (BER). Degradation of the signal during transmission across cable 32 occurs for a number of known reasons, such as echo due to reflections in cable 32, near end cross talk (NEXT) and far end cross talk (FEXT) due to the adjacency of conductors in cable 32, attenuation caused by length of cable 32, etc. Such reasons for degradation are internal to a communication channel that is formed between transceivers 12A-12D, 22A-22D by cable 32. Such internally-originated noise depends strictly on the physical characteristics of cable 32 and its connections to transceivers 22A-22D. Several prior art techniques have been developed, to suppress or cancel such internally-originated noise.

The signal transmitted through cable 32 (FIG. 1A) is occasionally further degraded by noise that originates externally ("externally-generated noise"). For example, coupling of electromagnetic energy radiated by a wireless device 31, such as a walkie-talkie typically occurs in cable 32, resulting in noise therein due to electromagnetic interference (EMI). The amount of such EMI noise that gets injected into a signal in cable 32 increases as the distance reduces between wireless device 31 and cable 32. When wireless device 31 is sufficiently close, the EMI noise picked up by cable 32 can so severely corrupt a signal carried therein that a link drop occurs. The amount of EMI noise that is picked up by a signal travelling through cable 32 depends on various characteristics of cable 32, such as shielding and grounding. When cable 32 is used to transfer data at a high rate, such as 10 Gbps, the current inventor believes that prior art shielding and become insufficient e.g. because electromagnetic fields penetrate through such shielding and induce currents in cable 32.

Some prior art methods may remove EMI from a signal that is received by any of transceivers 22A-22D by applying spectral analysis directly to the received signal. For further information on spectral analysis of a signal, see the following books: (1) Introduction to Spectral Analysis, by P. Stoica and R. Moses. Prentice Hall, N.J., 1997 and (2) Modern Spectral Estimation: Theory and Practice, by S. M. Kay, Prentice Hall, N.J. 1988. Also see the article entitled "Electromagnetic Coupling of Twisted Pair Cables" by Reinhard Stolle, published in IEEE JOURNAL ON SELECTED AREAS IN COMMUNICATIONS, VOL. 20, NO. 5, JUNE 2002, which is incorporated by reference herein in its entirety. This article provides a theoretical background and supplies simple approximation formulae for prediction of EMI.

To confirm the presence of EMI, several prior art methods of the type described in the preceding paragraph above, require collection of a large amount of data because the interference signal is embedded in the received signal. Depending on the method, the time required to collect such data can become so large as to result in a link drop between the transmitter and the receiver. Hence, the current inventor believes there is a need for confirmation of narrow band interference (EMI/RFI), as discussed below.

SUMMARY

One or more processing units confirm existence of narrow band interference in a signal (e.g. output by a front end processing circuit after receipt via a twisted pair cable) by using an estimate f of the frequency (received as an input), to check for presence of and disambiguate among, one or more harmonics of a fundamental frequency of interference. In an illustrative embodiment, the estimate f is automatically identified as a second harmonic if a predetermined criterion is satisfied by the signal (in the frequency domain) at either of two frequencies namely (A) frequency f/2 and (B) frequency (M−f)/2, and whichever of these two frequencies is stronger is identified as the fundamental frequency (i.e. instead of f itself). In the illustrative embodiment, the estimate f is similarly identified as a third harmonic if another predetermined criterion is satisfied by the signal (in the frequency domain) at any of three frequencies namely (C) frequency f/3 and (D) frequency (M−f)/3 and (E) frequency (M+f)/3 and one of these three frequencies is identified If the predetermined criteria are not met at all five frequencies (A)-(E) then f is identified as the fundamental frequency, in this illustrative embodiment.

DETAILED DESCRIPTION

In certain embodiments of the invention, a slicer 201 (FIG. 2A) receives a signal 101 that is output by a front end processing circuit after receipt via a twisted pair cable. A Front End Processing Circuit cancels certain types of noise, such as echo, FEXT and NEXT, in any manner that will be readily apparent to the skilled artisan e.g. as described in a US patent application, with Dariush Dabiri as the first-named inventor, that is concurrently filed herewith, and co-owned as follows:

(1) "Narrowband Interference Cancellation Method and Circuit", application Ser. No. 12/952,150.

The just-described patent application is hereby incorporated by reference herein, in its entirety.

Figure 1B:
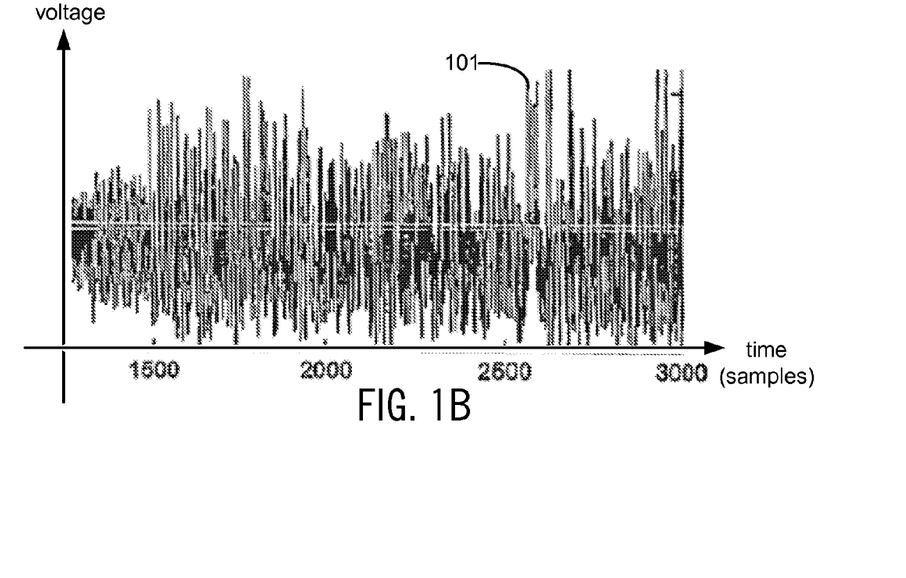
FIG. 1B illustrates, a time domain representation of a signal 101 that is extracted for noise cancellation in some embodiments of the invention, from a signal that is received from a remote transmitter.
Figure 1C:
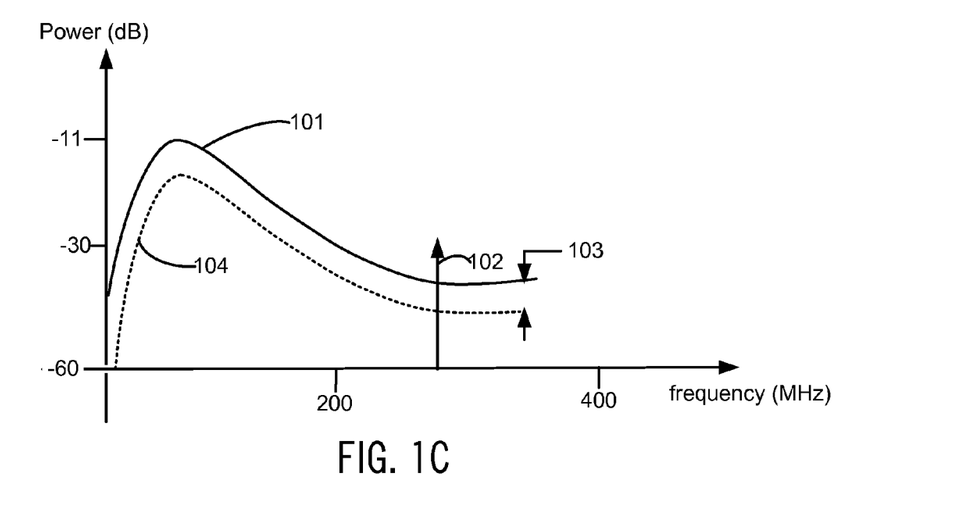
FIG. 1C illustrates a frequency domain representation of signal 101 of FIG. 1B showing noise 103 in addition to signal 104 transmitted by the remote transmitter.

In a signal 101 (shown in the time domain in FIG. 1B) generated by such a Front End Processing Circuit, when narrowband interference (NBI) is present, it may appear as one or more peaks in the frequency domain, e.g. see peak 102 illustrated in FIG. 1C. Accordingly, in several aspects of the invention, a slicer 201 (FIG. 2A) receives the signal 101 and generates a decision signal on bus 201O (FIG. 2A) that is representative of remote signal 104 (FIG. 1C), in the normal manner.

Figure 2A:
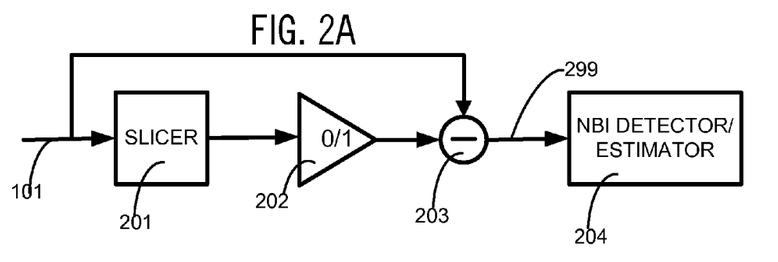
FIG. 2A illustrates, in a block diagram, hardware circuitry that processes extracted signal 101 before input as signal 299 to an NBI detector/estimator 204, in accordance with the invention.

Slicer 201 slices the signal 101 to obtain a sliced signal that in turn is supplied to a switch 202. Slicer 201 may be configured and operated in many different ways, as would be readily apparent to the skilled artisan, in view of this disclosure. In an illustrative aspect of the invention, slicer 201 is configured to generate a pulse amplitude modulated (PAM) signal, as the sliced signal. For example, slicer 201 may be implemented as described in U.S. Pat. No. 7,580,482 that is incorporated by reference herein in its entirety. In another illustrative aspect, slicer 201 is implemented by a processing unit that is coupled to an Ethernet transceiver of the type illustrated in FIG. 1 of US Patent Publication 2009/0238102 entitled "Generating An Estimated Non-Linear Echo Signal", incorporated by reference herein in its entirety. For additional background information on slicers, see the book entitled "Digital Communication" by John R Barry, Edward A. Lee, and David G. Messerschmitt, published in 2004 by Kluwer Academic Publishers.

Figure 2B:
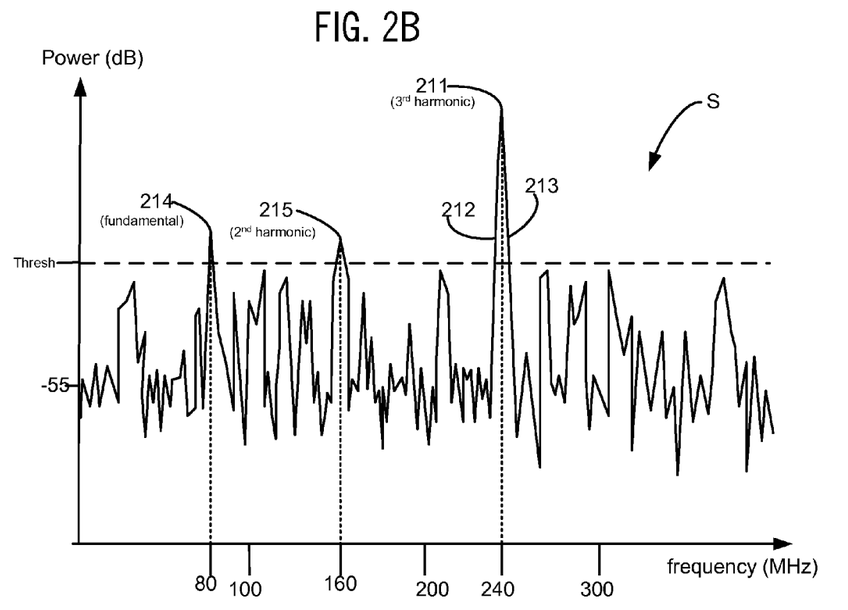
FIGS. 2B, 2C, 2D and 2E illustrate, in graphs, frequency domain representation of input signal 299 of FIG. 2A in various modes.
Figure 2C:
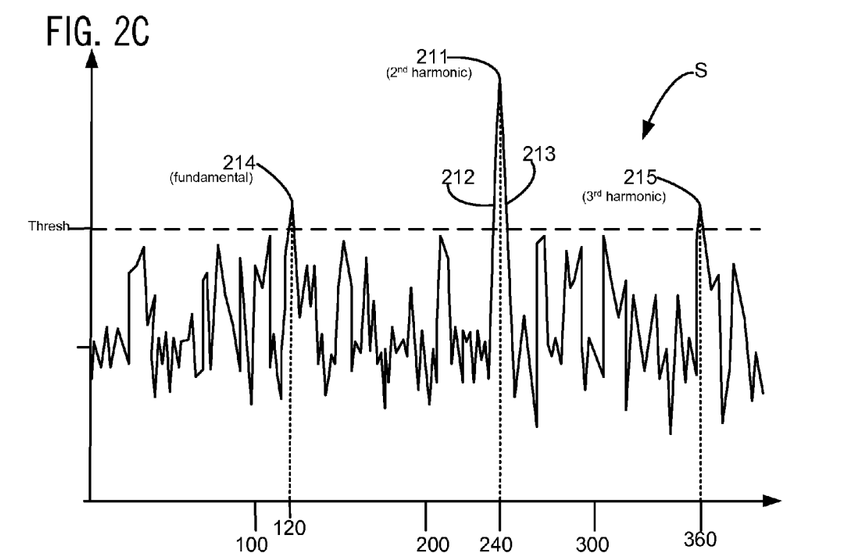

In several embodiments, an estimate of remote signal 104 as generated by slicer 201 is supplied to a switch 202 that operates a subtractor 203. Subtractor 203 in turn supplies one of two signals to EMI detector/estimator 204 as the input signal on line 299: (1) in mode 1, input signal on line 299 includes (a) noise, (b) EMI and (c) error in estimation of the remote signal as illustrated in FIG. 2B and (2) in mode 0, input signal on line 299 includes (a) noise, (b) EMI, (c) error in estimation and (d) remote signal as illustrated in FIG. 2C. In both modes, EMI detector/estimator 204 confirms the existence of narrow band interference in the input signal on line 299 by using an estimate f of the frequency, to check for presence of one or more harmonics as described next.

Figure 3A:
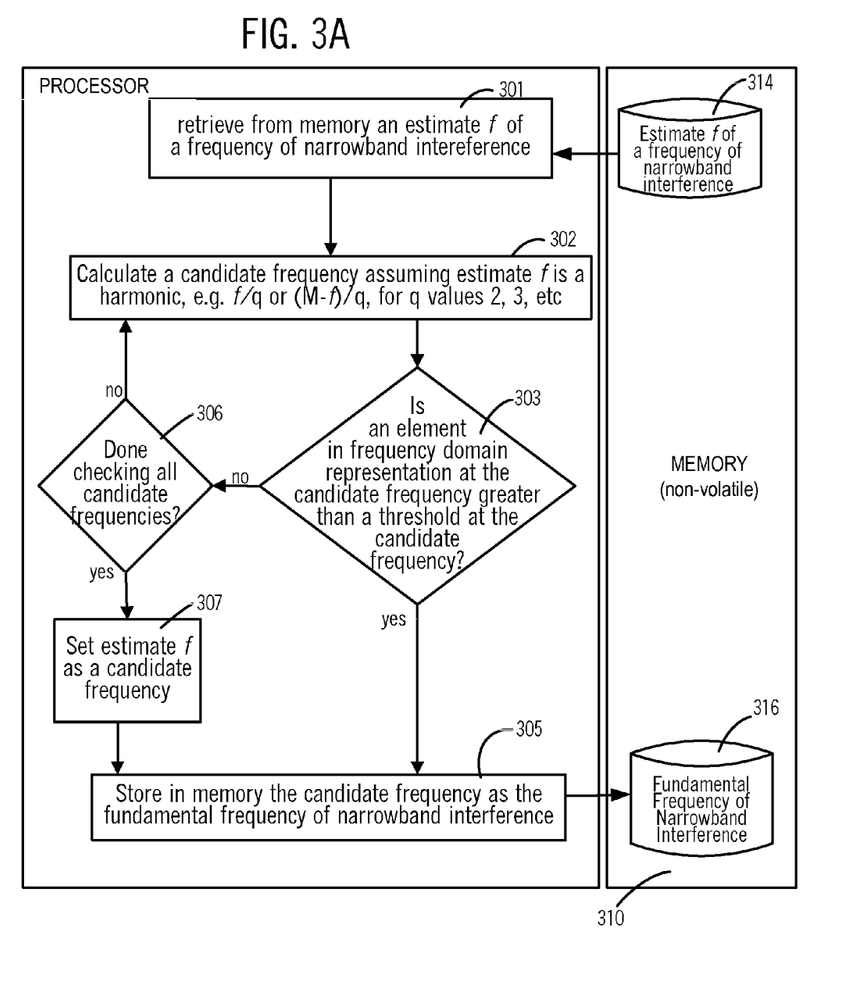
FIG. 3A illustrates, in a high-level flow chart, a method performed by NBI detector/estimator 204 in some embodiments of the invention.

In some aspects of the invention, EMI detector/estimator 204 performs the acts 301-307 illustrated in FIG. 3A after transforming its input signal 299 into the frequency domain using a fast fourier transform (FFT) stage. Specifically, in act 301, NBI detector/estimator 204 retrieves from a memory 310, an estimate 314 of a frequency f of narrowband interference in the input signal on line 299. In some illustrative embodiments, an estimate 314 is identified by matrix multiplication as described in a related patent application, with Dariush Dabiri as the first-named inventor, that is concurrently filed herewith, and co-owned as follows:

(2) "Detection and Estimation of Narrowband Interference By Matrix Multiplication", application Ser. No 12/952, 164.

The just-described patent application is hereby incorporated by reference herein, in its entirety.

Next, in act 302, EMI detector/estimator 204 calculates one or more candidates for a fundamental frequency of the NBI (e.g. calculates f/q for q values equal to the numbers 2, 3) assuming estimate f is a harmonic, such as the second harmonic or the third harmonic.

In an illustrative embodiment, f is initially assumed to be a second harmonic, and NBI detector/estimator 204 sets f/2 as a candidate fundamental frequency in act 302. For example, as shown in FIG. 2B, a peak 215 is initially identified and its frequency f is of value 160 MHz, so half of this value or 80 MHz is initially calculated as a candidate fundamental frequency (in FIG. 2B a peak 214 happens to exist at this frequency, and hence presence of NBI will be confirmed).

To account for aliasing caused by use of an FFT stage, NBI detector/estimator 204 computes an alternative for the fundamental frequency candidate as (M−f)/2, wherein M is the number of samples used in transformation from the time domain into the frequency domain (M is also the number of frequencies in the frequency domain). In some aspects of the invention M is selected to be 512, although other values of M such as 256 or 1024 may be used.

Figure 2D:
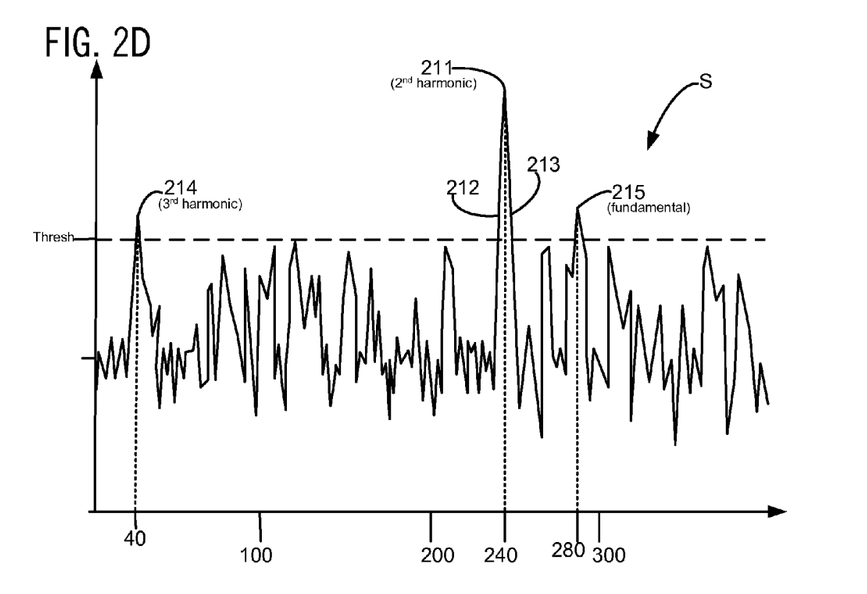

For example, as shown in FIG. 2C, f of value 240 MHz has a peak at 211, and assuming this is a second harmonic, NBI detector/estimator 204 may set the value f/2 or 120 MHz as a candidate fundamental frequency in act 302. Additionally, assuming M is 800, NBI detector/estimator 204 also computes (M−f)/2 as another candidate for the fundamental frequency in act 302, i.e. the value 280 as illustrated in FIG. 2D.

Additionally, NBI detector/estimator 204 also operates assuming f is a third harmonic, and EMI detector/estimator 204 sets any one of three frequencies namely f/3 or (M−f)/3 or (M+f)/3 as a candidate frequency in act 302.

To recap, in illustrative aspects of the invention, there are five frequencies to be tested (based on $2^{nd}$ and $3^{rd}$ harmonics) as follows: f/2, (M−f)/2, f/3, (M−f)/3 and (M+f)/3, and any one of these five may be selected as a candidate frequency in act 302. Note that when a subtraction is done, in some embodiments an absolute value is used, e.g. absolute value of (M−f)/2 and absolute value of (M−f)/3.

Next, in act 303, EMI detector/estimator 204 checks the input signal on line 299 (FIG. 2A) at the candidate frequency, to see if an element therein (in the frequency domain) is greater than a predetermined threshold. If the answer is true in act 303, then the fundamental frequency has been found in accordance with the invention and hence in act 305, EMI detector/estimator 204 stores in memory 310, as the fundamental frequency 316 of the narrowband interference, whatever candidate frequency was selected in act 302 and checked in act 303. For example, if f/2 was selected in act 302, then f/2 is now stored in memory 310 as the fundamental frequency. In act 303 if the answer is no, then act 306 is performed to check whether all candidate frequencies that are to be tested, have been checked. As noted in the prior paragraph, in some aspects of the invention, any of five frequencies can be selected in act 302 for testing, and if any of these five has not yet been checked (i.e. used in act 303) then the answer is no.

In act 306, if the answer is no (e.g. if only f/2 was checked in act 303), then EMI detector/estimator 204 returns to act 302. If in act 306, EMI detector/estimator 204 finds that all candidates (e.g. 5 candidates) for the fundamental frequency have been checked then EMI detector/estimator 204 goes to act 307. In act 307, EMI detector/estimator 204 sets the frequency f as a candidate frequency (by default) and goes to act 305 (described above). As noted above, in act 305, EMI detector/estimator 204 stores a candidate frequency as the fundamental frequency 316 in memory 310.

In several illustrative embodiments, an estimate f is automatically identified as a second harmonic if a predetermined criterion is satisfied by the signal (in the frequency domain) at either of two frequencies namely (A) frequency f/2 and (B) frequency (M−f)/2 and whichever of these two frequencies is stronger is identified as the fundamental frequency. In the illustrative embodiment, the estimate f is automatically identified as a third harmonic if another predetermined criterion is satisfied by the signal (in the frequency domain) at any of three frequencies namely (C) frequency f/3 and (D) frequency (M−f)/3 and (E) frequency (M+f)/3. If the predetermined criteria are not met at all five frequencies (A)-(E) then f itself is identified as the fundamental frequency in such illustrative embodiments.

In some embodiments, the above-described computations of the frequency to be checked use a rounding function A to ensure that an integer result for use in checking a corresponding bin (that is generated by an FFT stage). A rounding function that is used on several embodiments is selected to be either round-to-floor function A or a round-to-ceiling function B. In some embodiments, both rounding functions A and B are used, to generate two sets of frequencies, and a weighted average is taken between corresponding frequencies in the two sets, and the average is then checked as follows (although a single description for function A is provided below, the same description applies for the average). In certain embodiments, predetermined weights (that are provisioned) are used, to compute the weighted average.

Depending on the embodiment, weighted average can be computed as follows. To obtain a group of candidate weights of L elements, pre-compute $h_k$ (k=0, . . . ,L) given by:

$$h_k=[1/(k/L),1/(k/L-1)].$$

The pre-computed weight gk is given by, $$g_k=h_k/\sqrt{sum(h_k^2)}.$$

Then, the group of weights is given by $$G=\{g_0,g_1,\ldots,g_L\}.$$

Next, find a value S such that $$S=\text{argmax}_x \text{ abs}(g_k*[FFT \text{ output at } A, FFT \text{ output at } B]^T).$$

Some embodiments use S and $S^2$ as an absolute value of weighted average and a power of weighted average, respectively, depending on which value is to be compared. One can choose L=4 for example.

Figure 3B:
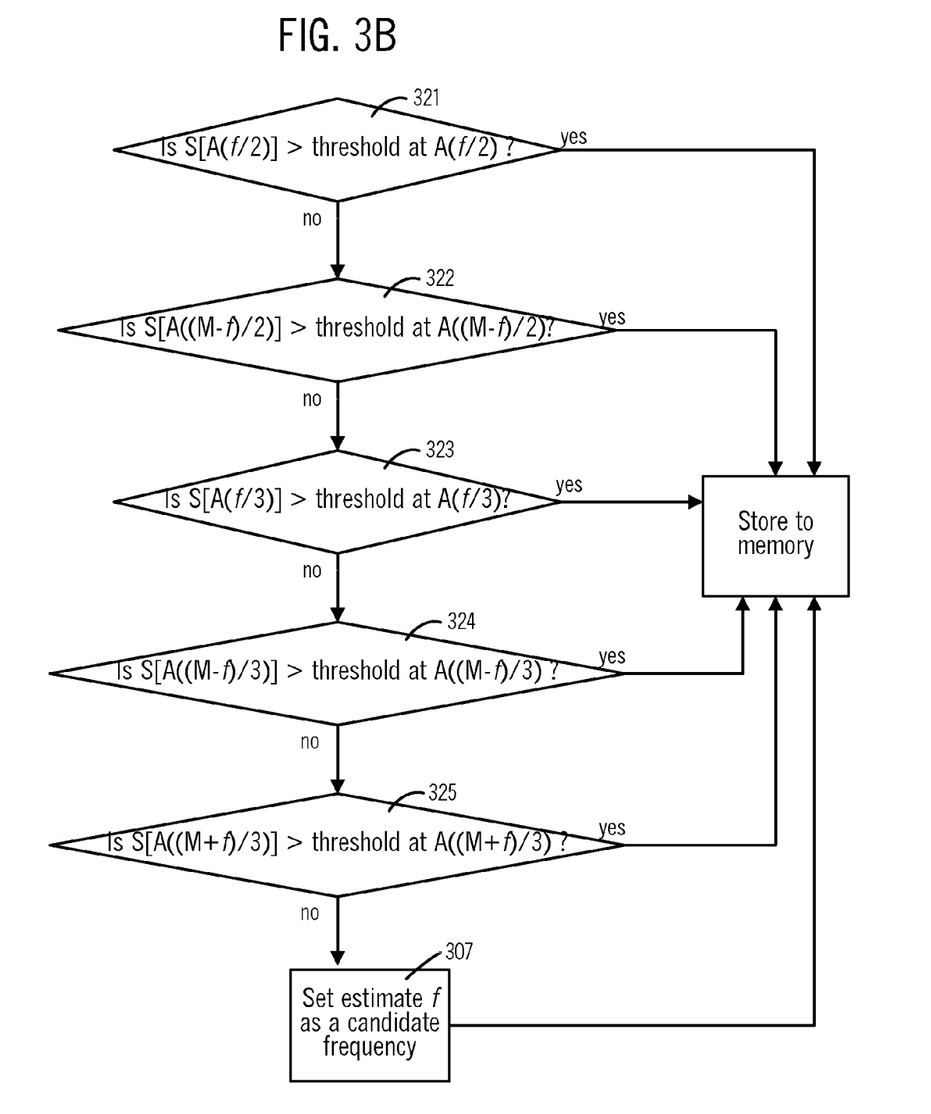
FIG. 3B illustrates, in an intermediate-level flow chart, a method performed by NBI detector/estimator 204, in certain embodiments of the invention.

In an illustrative embodiment, EMI detector/estimator 204 performs the acts 321-325 shown in FIG. 3B. Specifically, in act 321, EMI detector/estimator 204 checks if the power of bin S[A(f/2)] is greater than the threshold function at the frequency A(f/2) wherein A is a function to round an argument thereof to an integer. If the answer is yes on performing act 321, the value S[A(f/2)] is stored in memory as the fundamental frequency. If the answer is no then act 322 is performed, by checking if the power of bin S[A((M−f)/2)] is greater than the threshold function at the frequency A((M−f)/2). Again if the answer is yes, then the value S[A((M−f)/2)] is stored in memory as the fundamental frequency. If the answer is no then act 323 is performed, by checking if the power of bin S[A(f/3)] is greater than the threshold function at the frequency A(f/3). Here too, if the answer is yes, then the value S[A(f/3)] is stored in memory as the fundamental frequency. If the answer is no then act 324 is performed, by checking if the power of bin S[A((M−f)/3)] is greater than the threshold function at the frequency A((M−f)/3). Again if the answer is yes, then the value S[A((M−f)/3)] is stored in memory as the fundamental frequency. If the answer is no then act 325 is performed, by checking if the power of bin S[A((M+f)/3)] is greater than the threshold function at the frequency A((M+f)/3). Again if the answer is yes, then the value S[A((M+f)/3)] is stored in memory as the fundamental frequency. At this stage, if the answer is no, then act 307 is performed to identify f itself as the fundamental frequency.

Note that although as specific order of acts 321-325 is shown in FIG. 3B, these acts (or other similar acts) may be performed in any other order, relative to one another depending on the application. For example, if it is known that use f a certain type of wireless device with a certain type of cable in a specific data center happens to result in a frequency spectrum wherein the second harmonic is strong, then for this application EMI detector/estimator 204 is provisioned to start by checking the power of the second harmonic first—additionally if it is known that the background noise at (M−f)/2 is higher than at f/2 then EMI detector/estimator 204 can be provisioned to check f/2 first, before checking (M−f)/2. Therefore the sequence of acts 321-325 shown in FIG. 3B is merely illustrative.

Figure 2E:
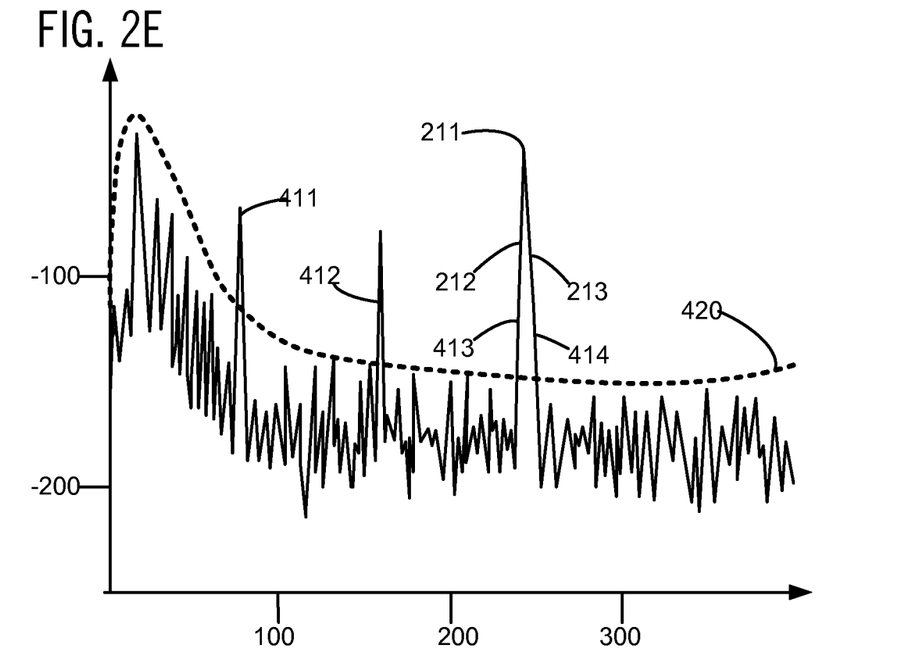

In several embodiments, a threshold that is checked is not constant across the frequency range and instead it is represented by a function that varies depending on the frequency, as shown by a dashed line in FIG. 2E. Moreover, the threshold function that is used in some embodiments differs, depending on which harmonic is being checked. Threshold functions of the type illustrated in FIG. 2E are provisioned ahead of time, depending on a number of factors such as knowledge of and confidence in background noise. For example, if use of a certain type of wireless device with a certain type of cable in a specific data center is known to not generate any second harmonic then the threshold function for the second harmonic is set to zero.

Certain alternative embodiments operate with different assumptions, e.g. assume that f is a fundamental frequency and then compute the product 2*f to check for a peak at the second harmonic and when the product 2*f1 happens to exceed the frequency at M/2, the second harmonic frequency 2*f1 is assumed to be aliased back into a bin that is still within the frequency range of the FFT stage, by checking if the power at f(M)−2*f1 exceeds a preset threshold for the second harmonic. Similarly, third harmonic checking may account for aliasing when the aliasing condition 3*f>f(N/2) is met, by assuming the third harmonic frequency 3*f is aliased back. For example, EMI detector/estimator 204 may check if another preset threshold for the third harmonic is met at the frequency f(N)−3*f1.

Depending on the aspect of the invention, the FFTs may be formed by using a sliding window of a predetermined number M (such as 512) with 50% overlap (whereby a second FFT is formed starting with the 257 th sample and third FFT is formed starting with the 513rd sample and so on).

In some embodiments of the invention, after the three frequency components of NBI are isolated as described above, the isolated components (also called "tones") are used to generate a predicted-interference signal that can be used to cancel the NBI as described in either one or both of two US patent applications, with Dariush Dabiri as the first-named inventor, that are concurrently filed herewith, and co-owned as follows:

(3) "Adaptive Narrowband Interference Prediction Circuit and Method", application Ser. No. 12/952,184; and
(4) "Adaptive Spectral Enhancement and Harmonic Separation", application Ser. No. 12/952,178.

The just-described two patent applications are hereby incorporated by reference herein, in their entirety.

Figure 4:
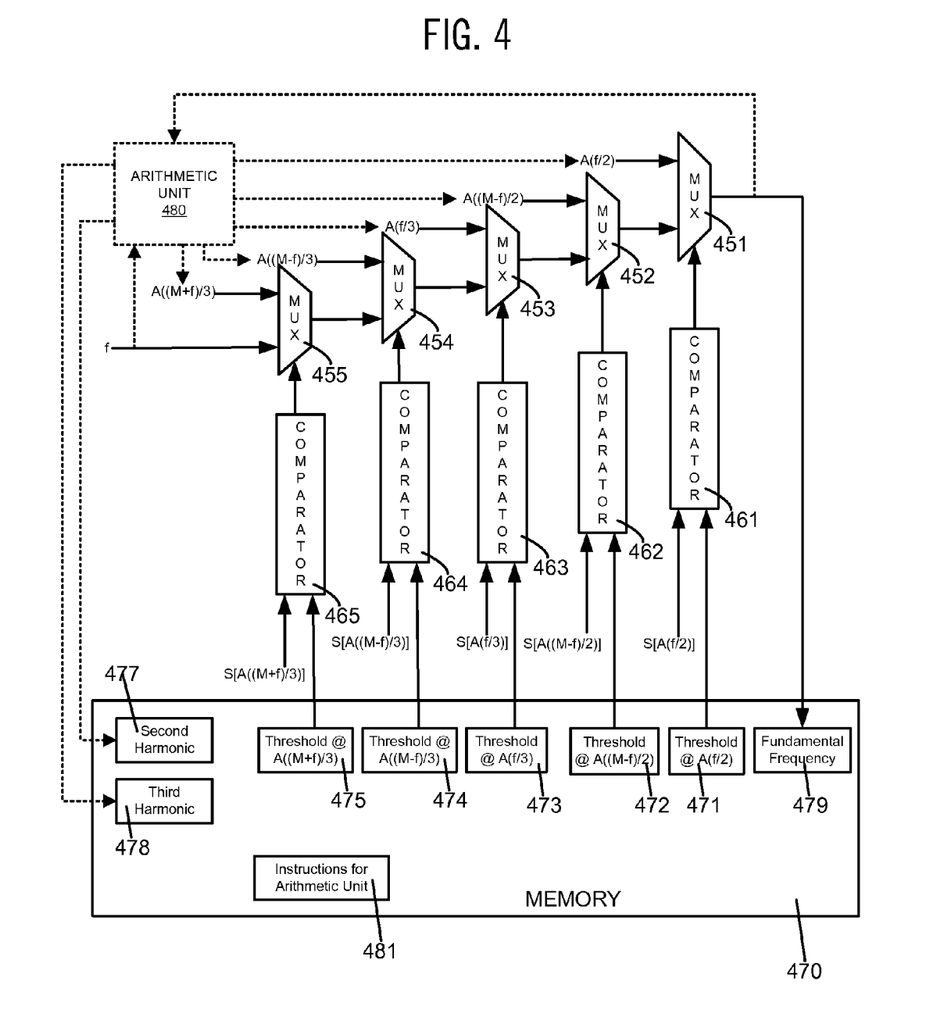
FIG. 4 illustrates, in a high-level block diagram, a circuit that is included in NBI detector/estimator 204 of some embodiments in accordance with the invention.

In some embodiments, an EMI detector/estimator 204 includes circuitry illustrated in FIG. 4. Specifically, EMI detector/estimator 204 includes multiplexers 451-455 that are arranged in a cascaded fashion. Specifically each of multiplexers 451-455 selects one of two input signals as its output signal. Each of multiplexers 452-455 supplies its output signal as an input signal to a corresponding one of multiplexers 451-454. The selection made by multiplexers 451-455 depends on a control signal from a corresponding one of comparators 461-465 that are also included in EMI detector/estimator 204.

Comparators 461-465 receive as one of their inputs, a frequency-dependent threshold value, from a corresponding one of memory locations 471-475 in memory 470 also included in EMI detector/estimator 204. The threshold values in memory locations 471-475 are set by signals input to EMI detector/estimator 204, for a corresponding one of five to-be-tested frequencies obtained by applying the rounding function A namely: A(f/2), A((M−f)/2), A(f/3), A((M−f)/3), and A((M+f)/3). Each of comparators 461-465 also has as its other input, a value of signal S at the just-described five to-be-tested frequencies. The to-be-tested five frequencies are also supplied as inputs to multiplexers 451-455. The output of multiplexer 451 is stored in a memory location 479 as the fundamental frequency.

In several embodiments, the fundamental frequency in memory location 479 is scaled by an arithmetic unit 480 (see FIG. 4), e.g. by values 2 and 3 to obtain the second harmonic stored in location 477 and the third harmonic stored in location 478 respectively. The just-described arithmetic unit (see FIG. 4), may also be used with frequency f as its input, to compute the five to-be-tested frequencies namely A(f/2), A((M−f)/2), A(f/3), A((M−f)/3), and A((M+f)/3). Arithmetic unit 480 may be operated by execution of instructions 481 that are also stored in memory 470 in some embodiments. Furthermore, the three frequencies in memory locations 477-479 may be used to generate a predicted-interference signal, in certain embodiments. Note that instead of an arithmetic unit 480, some embodiments use combinational logic to generate the five to-be-tested frequencies from the frequency f. Moreover, frequency f that is input to the circuitry illustrated in FIG. 4 may be generated in any manner that will be apparent to the skilled artisan. In some embodiments, frequency f is generated as estimate 314, by matrix multiplication as described above in reference to the related patent application, that is concurrently filed herewith, entitled "Detection and Estimation of Narrowband Interference By Matrix Multiplication", and identified by application Ser. No. 12/952,164.

Embodiments of the type described herein may be used to implement 10 GBASE-T PHYs of the type described in a Preliminary Product Brief document entitled "Triveni Dual/Quad Port 10 GBASE-T PHY" published July 2010 by AMCC that is incorporated by reference herein in its entirety, and available at the following address on the Internet, wherein forward slash has been replaced by "%" sign. http:%%www.appliedmicro.com%MyAMCC%retrieveDocument%MXD%TechDocs%AP M9xxxx%APM96892_93_94_95%APM96892_93_94_95_Triveni_PB2162.pdf One or more circuits and/or methods described herein may be implemented and/or performed in various ways. For example, one or more features and/or circuit elements and/or method steps/acts described above and/or illustrated in FIGS. 2A, 2B, 3A-3E, 4, 5, and 6 may be implemented in hardware, firmware, software, or a combination thereof. For several implementations, one or more features and/or circuit elements and/or method steps/acts described above and/or illustrated in the just-described figures may be used and/or implemented within specific hardware, e.g. one or more application specific integrated circuits (ASICs), digital signal processors (DSPs), programmable logic devices (PLDs), field programmable gate arrays (FPGAs), processors, controllers, micro-controllers, microprocessors, electronic devices, circuits and systems designed to perform the functions described herein, or a combination thereof. For certain implementations, one or more features and/or circuit elements and/or method steps/acts described above and/or illustrated in the just-described figures may be implemented with modules (e.g., procedures, functions, and so on) that perform the functions described herein by use of software and/or firmware executing in hardware of the type just described in the previous sentence. Additionally, any non-transitory machine readable medium tangibly embodying instructions may be used in implementing one or more features and/or circuit elements and/or method steps/acts described above and/or illustrated in the above-described figures. Also, as used herein the terms "memory" and "storage element" refer to any type of long term, short term, volatile (e.g. DRAM), nonvolatile (e.g. SRAM), flip-flop, latch, or other memory that is non-transitory and accessible by any circuitry, such as a processor.

Numerous modifications and adaptations of the embodiments described herein will become apparent to the skilled artisan in view of this disclosure. Numerous modifications and adaptations of the embodiments described herein are encompassed by the scope of the invention.

What is claimed is:

1. A method of processing a signal, the method comprising:
retrieving from a computer-readable memory, an estimate f of a frequency of narrowband interference in said signal:
using at least one processing unit coupled to the computer-readable memory to check if a first predetermined criterion is satisfied, by a first element in a frequency domain representation S[0]-S[M−1] of said signal, on at least one of (a) frequency f/q and (b) frequency (M−f)/q, wherein S is an absolute weighted average, and wherein q is an integer greater than 1 and M is a quantity of samples used in a frequency domain transformation; and storing in said computer-readable memory coupled to said at least one processing unit, a flag indicative of a result of said checking.

2. The method of claim 1 further comprising: checking if a second predetermined criterion is satisfied by a second element in the frequency domain representation S[0]-S[M−1] of said signal on the other of (a) frequency f/q and (b) tency (M−f)/q.

3. The method of claim 2 wherein q is equal to 3 and the method further comprises: checking if a third. predetermined criterion is satisfied by a third. element in the frequency domain representation S[0]-S[M−1] of said signal on (c) frequency (M+f)/3.

4. The method of claim 2 wherein q is equal to 2 and the method further comprises:

repeating at least said using with q equal to 3 and additionally checking if a third predetermined criterion is satisfied by a third element in the frequency domain representation S[0]-S[M−1] of said signal at (c) frequency (M+f)/3; and identifying f as a harmonic frequency if no values of said signal at respective frequencies f/2, (M−f)/2, f/3, (M−f)/3 and (M+f)/3 are found to satisfy corresponding predetermined criteria.

5. The method of claim 1 wherein said using comprises: computing a first approximation of an absolute value of each of elements S[A(f/q)] and S[A((M−f)/q)] in the frequency domain representation S[0]-S[M] of the signal; wherein A is a function to round an argument thereof to an integer.

6. The method of claim 5 wherein: said integer is closest to said argument of function A.

7. The method of claim 5 wherein said integer is smaller than said argument, and said function A is round-to-floor function, the method further comprising:

computing a second approximation of the absolute value of each of elements S[B(f/q)] and S[B((M−f)/q)] wherein B is a round-to-ceiling function; and computing a weighted average of said first approximation and said second approximation at each of frequencies f/q and (M−f)/q based on a plurality of predetermined weights.

8. The method of claim 1 further comprising: identifying A(f/q) as a harmonic frequency depending on an outcome of the first predetermined criterion;

wherein A is a function to round an argument thereof to an integer.

9. A circuit for processing a signal, the circuit comprising at least a processor, the circuit comprising:

a memory coupled to the processor, the memory comprising an estimate f of a frequency of narrowband interference in said signal;

means, coupled to the memory, for checking if a first predetermined criterion is satisfied, by a first element in a frequency domain representation S[0]-S[M−1] of said signal, on at least one of (A) frequency f/q and (B) frequency (M−f)/q, wherein S is an absolute weighted average, and wherein q is an integer greater than 1 and M is a quantity of samples used in a frequency domain transformation; and means for storing in said memory an indication of a result generated at least partially by said means for checking.

10. The circuit of claim 9 further comprising: means for checking if a second predetermined criterion is satisfied by a second element in the frequency domain representation S[0]-S[M−1] of said signal on the other of (A) frequency f/q and (B) frequency (M−f)/q.

11. The circuit of claim 10 wherein q is equal to 3 and the circuit further comprises: means for checking if a third predetermined criterion is satisfied by a third clement in the frequency domain representation S[0]-S[M−1] of said signal (C) frequency (M+t)/3.

12. The circuit of claim 10 wherein q is equal to 2 and the circuit further comprises:

additional means for checking with q equal to 3 and checking if a third predetermined criterion is satisfied by a third element in the frequency domain representation S[0]-S[M−1] of said signal at (C) frequency (M+t)/3; and means for identifying f as a harmonic frequency if no values of said signal at respective frequencies f/2, (M−f)/2, f/3, (M−f)/3 and (M+f)/3 are found to satisfy corresponding predetermined criteria.

13. The circuit of claim 9 wherein said means for checking comprises:

means for computing a first approximation of an absolute value of each of elements S[A(f/q)] and S[A((M−f)/q)] in the frequency domain representation S[0]-S[M] of the signal; wherein A is a function to round an argument thereof to an integer.

14. The circuit of claim 13 wherein: said integer is closest to said argument of function A.

15. The circuit of claim 13 wherein said integer is smaller than said argument, and said function A is round-to-floor function, the circuit further comprising:

means for computing a second approximation of the absolute value of each of elements S[B(f/q)] and S[B((M−f)/q)] wherein B is a round-to-celling function; and means for computing a weighted average of said first approximation and said second approximation at each of frequencies f/q and (M−f)/q based on a plurality of predetermined weights.

16. The circuit of claim 9 further comprising:

means for additionally checking if S[A(f/q)] is greater than S[A(M−f)/q)]; and means for identifying A(f/q) as a harmonic frequency if a result generated by said means for additionally checking is true; wherein A is a function to round an argument thereof to an integer.

* * * * *